(12) United States Patent
Colantonio et al.

(10) Patent No.: US 6,367,528 B1
(45) Date of Patent: Apr. 9, 2002

(54) TIRE DEFLECTION ALARM

(75) Inventors: Laurent Colantonio, Bastogne; Gia Van Nguyen, Rossignol, both of (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/515,076

(22) Filed: Feb. 28, 2000

(51) Int. Cl.$^7$ .......................... B60C 5/00; B60C 17/00; B60C 19/00; B60C 23/00
(52) U.S. Cl. ...................... 152/540; 152/516; 116/34 R
(58) Field of Search ................................ 152/450, 518, 152/519, 520, 418, 516; 116/34 R; 73/146.8; 340/58

(56) References Cited

U.S. PATENT DOCUMENTS

| | | |
|---|---|---|
| 1,038,433 A | 9/1912 | Polo |
| 1,144,239 A | 6/1915 | Poole |
| 1,195,883 A * | 8/1916 | Wells .......................... 116/34 |
| 1,364,300 A | 1/1921 | Parr |
| 1,445,043 A | 2/1923 | Sampson et al. |
| 1,488,861 A | 4/1924 | Brown |
| 2,713,372 A | 7/1955 | Darrow |
| 2,723,700 A | 11/1955 | Caldwell |
| 2,754,876 A | 7/1956 | King |
| 2,884,983 A | 5/1959 | Cuesta |
| 3,030,911 A | 4/1962 | Dilts |
| 3,055,998 A | 9/1962 | Collins |
| 3,085,615 A | 4/1963 | Sanderson |
| 3,111,930 A | 11/1963 | Zipper |
| 3,154,048 A | 10/1964 | Neu |
| 3,254,692 A | 6/1966 | Travers |
| 3,413,598 A | 11/1968 | Uphoff |
| 3,472,197 A | 10/1969 | Poole |
| 3,489,998 A | 1/1970 | O'Neal et al. |
| 3,496,903 A | 2/1970 | Adahan |
| 3,533,063 A | 10/1970 | Garcia |
| 3,659,264 A | 4/1972 | Barabino |
| 3,719,159 A | 3/1973 | Davis |
| 3,835,808 A | 9/1974 | Stevens |
| 4,059,138 A | 11/1977 | Mirtain et al. |
| 4,067,376 A | 1/1978 | Barabino |
| 4,103,282 A | 7/1978 | Cook |
| 4,111,249 A | 9/1978 | Markow |
| 4,201,147 A | 5/1980 | Goshima et al. |
| 4,235,184 A | 11/1980 | Schiavone |
| 4,262,724 A | 4/1981 | Sarkissian |
| 4,353,322 A | 10/1982 | Weglin et al. |
| 4,476,455 A | 10/1984 | Kawakami |
| 4,487,154 A | 12/1984 | Daly et al. |
| 4,580,519 A | 4/1986 | Brewer |
| 4,814,744 A | 3/1989 | Collins |
| 5,207,173 A | 5/1993 | Sadri |

FOREIGN PATENT DOCUMENTS

DE      3942997 A   *   5/1989

* cited by examiner

*Primary Examiner*—Michael W. Ball
*Assistant Examiner*—Justin Fischer
(74) *Attorney, Agent, or Firm*—Howard M. Cohn

(57) ABSTRACT

A tire assembly (100) comprises a tire (110), a rim (112) having a rim well (124), and an alarm system (114). The tire assembly (100) is characterized by the alarm system (114) having a belt (130) disposed tightly around the rim well (124), a bladder (132*a*) attached to the belt, and a whistle (136*a*) within the tire cavity (128).

19 Claims, 4 Drawing Sheets

TIRE DEFLECTION ALARM

TECHNICAL FIELD

The present invention relates to a low pressure warning system for a pneumatic tire, and more particularly for a runflat tire.

BACKGROUND OF THE INVENTION

Loss of tire pressure can result from a variety of causes such as a deteriorated seal between the tire and rim or a tire puncture by a sharp object. Various methods have been devised for enabling the safe continued operation of deflated or under-inflated (flat) tires without damaging the tire further and without compromising vehicle handling while driving to where the tire can be changed. Tires designed for continued operation under deflated or under-inflated conditions are referred to as "extended mobility technology" tires or "EMT" tires. They are also called "runflat" tires, since they are capable of being driven when flat. The runflat tire's structure alone has sufficient strength to support the vehicle load when the tire is deflated.

There are numerous support structures that can be incorporated into the tire or rim construction to impart runflat capability. For example, U.S. Pat. No. 4,111,249 discloses a runflat tire having an annular compression band (hoop) of solid high-strength metal or reinforced composite, located below the tread, either under or within the carcass. U.S. Pat. No. 4,059,138 discloses a runflat tire having, around the metal hub, an elastomeric ring that supports the inner central portion of the carcass when the tire is deflated.

The most common support structures to impart runflat capability are wedge inserts ("inserts"), which are fillers generally having a crescent shaped cross-section, located within the sidewall, which is the region in the tire experiencing the greatest flex under load. The inserts reinforce (stiffen) the sidewall to avoid sidewall buckling during runflat operation (i.e. while running under-inflated).

For a conventional (non-runflat) tire, it is important for the driver to be immediately aware of a deflated condition, so that he can repair the tire as soon as possible to minimize running the tire when deflated, because operating a non-runflat tire when deflated can quickly degrade and/or damage the tire and rim.

Even with a runflat tire, which is meant to be driven deflated, a driver must be immediately aware of a deflated condition, so that he can minimize operating the tire when deflated. During runflat operation, due to the relatively large mass of material (including inserts) in the runflat tire's sidewalls, heat builds up from cyclical flexure of the sidewalls. If driven in runflat operation for a prolonged period, the heat can degrade the inserts and other tire components and will eventually cause the inserts to fail, resulting in the very inconvenience and damage that the insert was intended to avoid. Additionally, the hysteresis of the material of the relatively thick sidewalls contributes to material fatigue and rolling resistance (which reduces fuel efficiency).

A conventional (non-runflat) tire's sidewalls and tread continually buckle and flop as they rotate when driven while flat, so the driver can usually sense the existence of the flat through the resulting sounds he hears and the vibrations he feels. In contrast, a runflat tire's sidewalls and tread do not collapse or buckle, unless they have been driven in runflat operation to the point of failure. Runflat inserts often operate so smoothly that the driver is unaware of a tire deflation and can continue to drive until the insert eventually fails.

Numerous tire deflation indicators (or alarms) have been disclosed in the patent literature, although few of them particularly for a runflat tire. Many tire deflation indicators include a pressure sensor and radio frequency transmitter within the tire cavity and a receiver outside the tire cavity. These designs have the disadvantage of high cost and difficulty of conveying electric power to the components in the tire cavity. Other tire deflation indicators entail sensing the difference in rotational speeds between the vehicle's four tires. They are costly to implement and suffer from interferences. Other tire deflation indicators include an electronic pressure sensor attached to a valve stem or tube leading to the tire cavity. These have the difficulty of conveying electric power to the rotating components. Other tire deflation indicators include a mechanical pressure responsive mechanism attached to a valve stem or tube exiting the rim. These add complexity to the rim construction. Other tire deflation indicators have a "feeler" rod, connected to a switch, that activates the switch when it contacts the bulging tire sidewall or the road surface. These mechanisms are cumbersome and prone to breakage.

To avoid some of the disadvantages of the aforementioned deflation indicators, several tire deflation indicators are disposed within the tire cavity and do not require electric power. For example, some tire deflation indicators have an insert (either in the sidewall or tire cavity) having nonuniform radius to cause wheel vibration in runflat operation to alert the driver. These designs can be costly and yield an uncomfortable runflat ride. U.S. Pat. No. 3,154,048 discloses a tire deflection warning device positioned within the tire's interior, having a metal knocker and a spring, both positioned between a wheel rim and belt around the rim. When the tire flexes inwardly, the knocker is brought suddenly against the steel rim with each tire rotation to create a loud noise. U.S. Pat. No. 4,476,455 discloses an inflation warning device in which a ball strikes the wall of a case upon each revolution when the tire is deflated. U.S. Pat. Nos. 4,487,154 and 4,201,147 disclose low pressure warning devices having a striker or hammer that strikes the wheel rim when the pressure is low. Other low tire pressure alarms are disclosed in U.S. Pat. Nos. 3,030,911; 4,353,322; 4,580,519; and 5,207,173. These designs are prohibitively costly, can degrade wheel balance, and have rotating metal junctions that can corrode or seize. Some of them depend on centrifugal force to work, which renders them inoperative at slow speeds.

U.S. Pat. No. 1,195,883 discloses a "leak-alarm for pneumatic tires" having a whistle fitted to a rubber bulb that is vulcanized to, or made an integral part of, an inner tube. When the inner tube is deflated, the bulb is "compressed, forcing the air from the bulb through the whistle and sounding the alarm". This has the disadvantages of requiring a specially-made inner tube and causing tire imbalance. Even if the device is applied to a tubeless tire (which is not disclosed), it would require a specially-made tire and cause tire imbalance.

U.S. Pat. No. 3,489,998; 3,659,264; 4,067,376 and 4,103,282 disclose various tire pressure warning systems entailing components mounted to vehicle wheel that, in response to low inflation, produce an acoustic (sonic or ultrasonic) vibration that is sensed by a receiver outside the tire, to generate a warning signal to the driver. These systems are not responsive to tread deflection.

It is desirable to have a alarm that is responsive to tread deflection so that it warns of heavy vehicle load along with low pressure. It is desirable to have a tread deflection alarm that is simple, low cost, light, not affecting tire balance, adaptable to standard tires and rims without alteration, out-of-sight (concealed within the tire), and not requiring electric power.

SUMMARY OF THE INVENTION

According to the present invention, a tire assembly comprises a tire (such as a runflat tire), a rim having a rim well; and an alarm system. The tire assembly is characterized by the alarm system having a belt disposed tightly around the rim well and a first bladder attached to the belt. The alarm system can include a first whistle attached to the first bladder disposed within the tire cavity.

The alarm system can have a second bladder with a second whistle attached to the belt on the opposite side of the rim well from the first bladder. Alternatively, the alarm system can have a counterweight attached to the belt on the opposite side of the rim well from the first bladder.

Both the first and second whistles emit an audible whistle when air passes through them in either the inhale and/or exhale directions. The whistles can also emit an ultrasonic whistle at a distinct frequency; and the tire assembly also has, disposed outside the tire cavity, an electronic circuit that is sensitive to the distinct ultrasonic frequency and can distinguish the whistle of the whistle from environmental noise. The circuit can distinguish the whistle sound from environmental noise based on frequency and periodicity.

In another embodiment, the first bladder is connected to a percussion noise-making mechanism within the tire cavity.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the figure number, and similar elements are usually referred to by similar reference numbers.

Figure 1A:
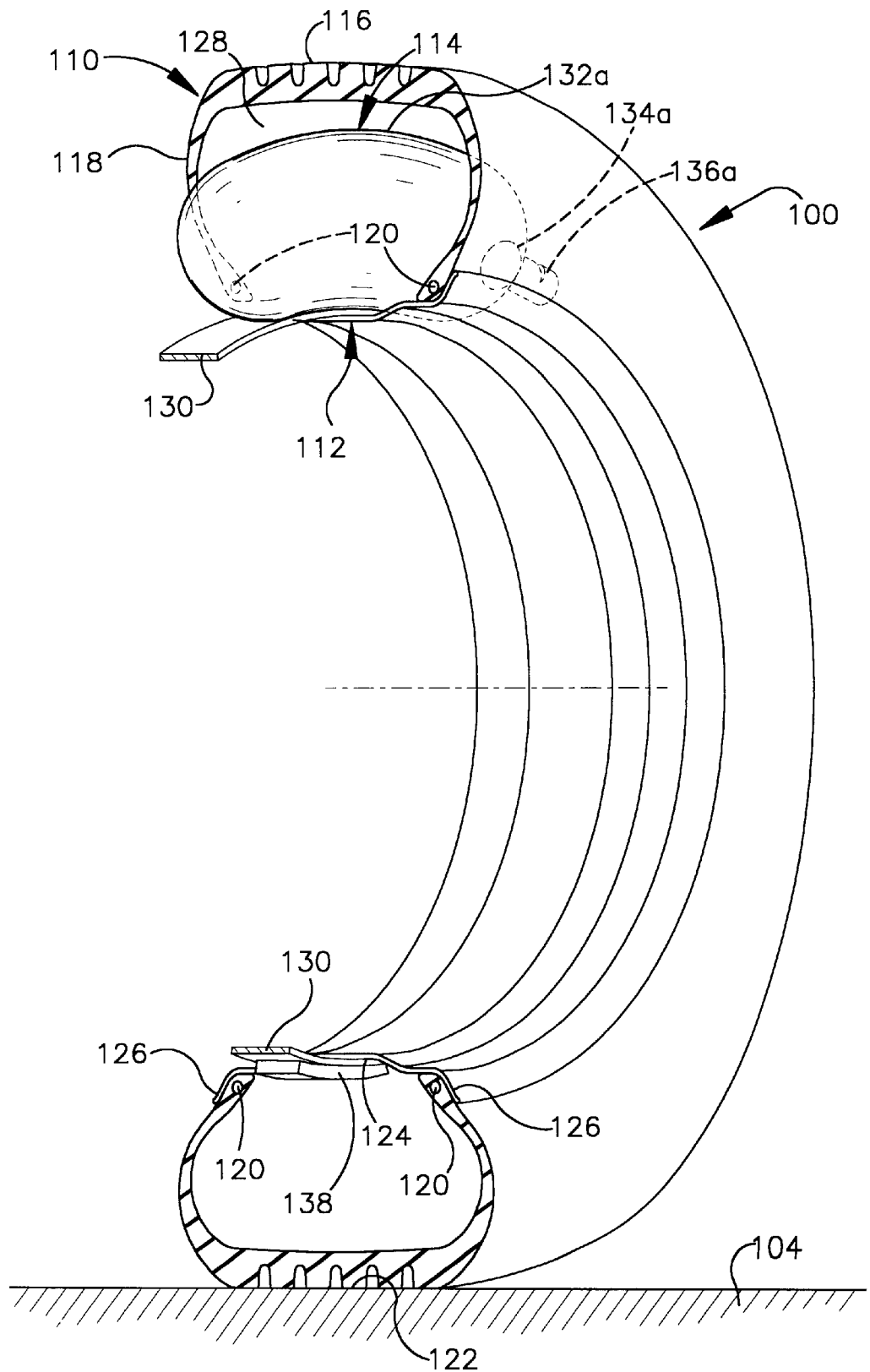
Figure 1B:
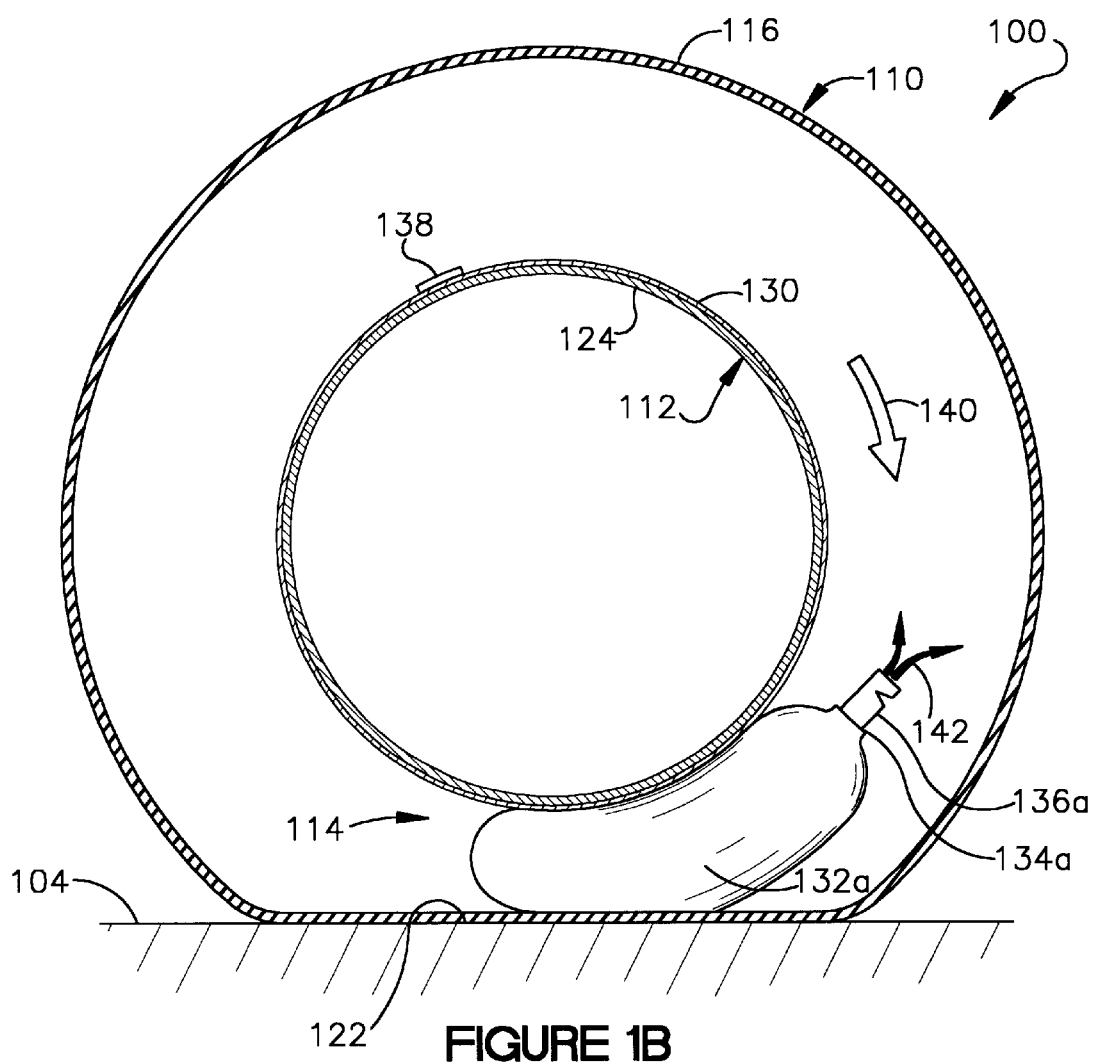
Figure 1C:
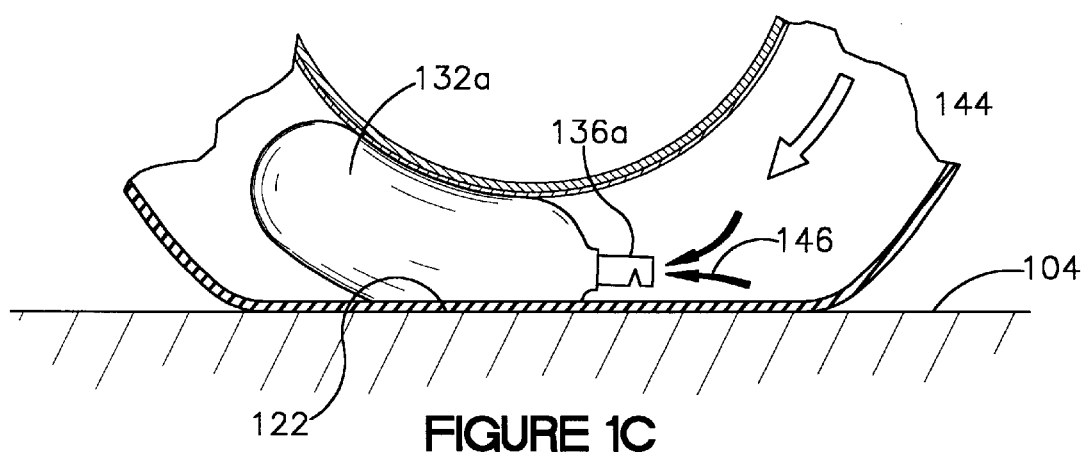
Figure 1D:
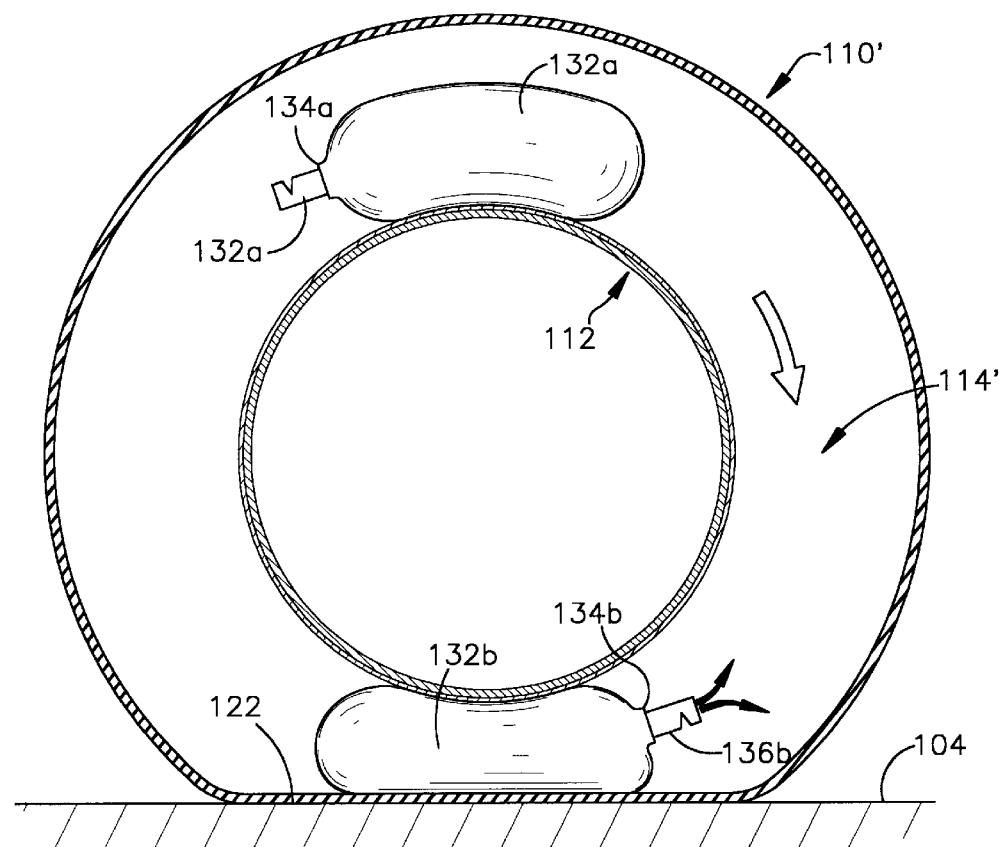
Figure 2:
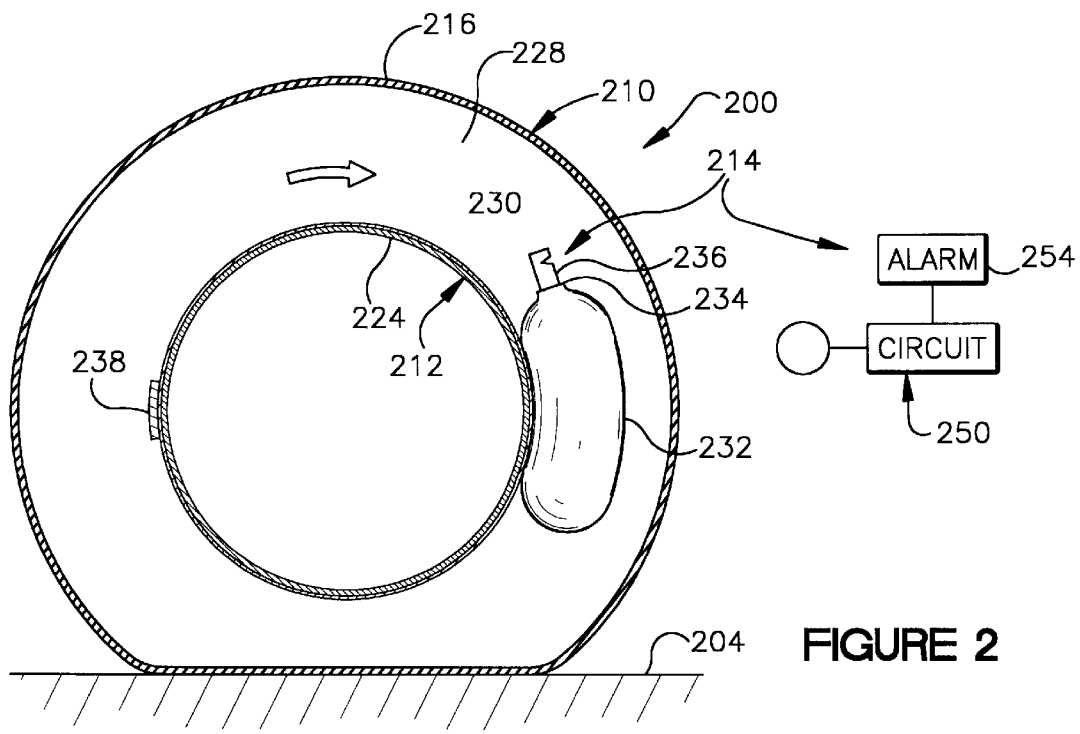

For example, element 199 in FIG. 1 and element 299 in FIG. 2 might indicate corresponding or substantially similar elements.

The same element appearing in different figures might be given the same reference number in all figures.

In a single drawing, similar elements may be assigned the same number. For example, both beads of the same tire may be assigned the same number.

For illustrative clarity, the cross-sectional views presented herein may be in the form "near-sighted" cross-sectional views, omitting certain background lines that would otherwise be visible in a true cross-sectional view.

Figure 3A:
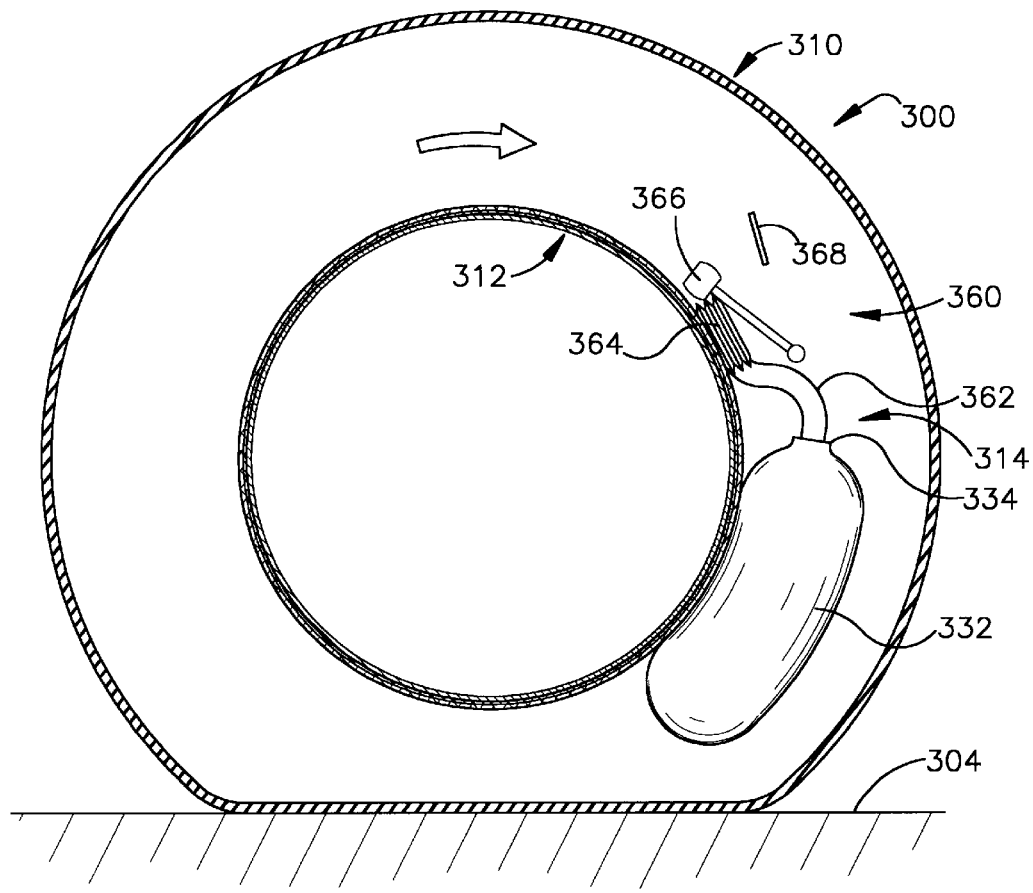
Figure 3B:
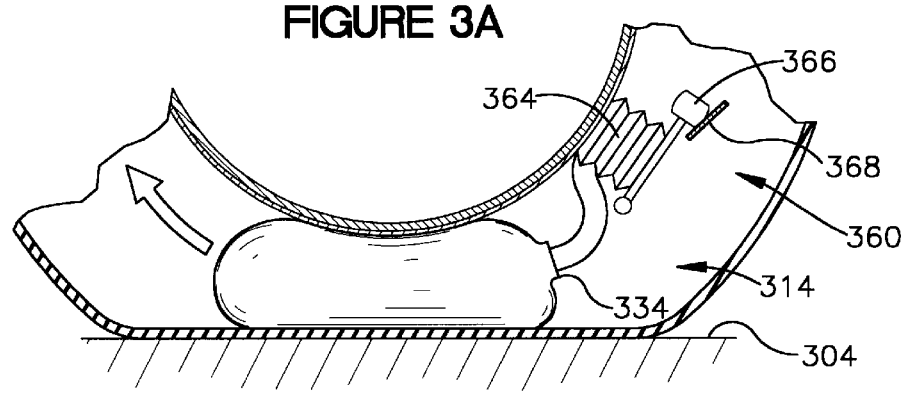
Figure 3C:
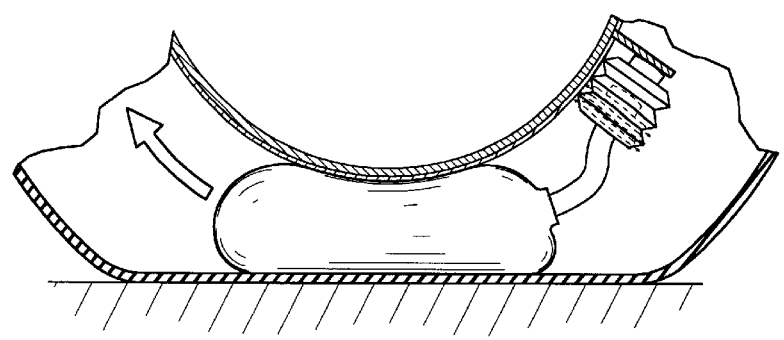

The structure, operation, and advantages of the invention will become further apparent upon consideration of the following description taken in conjunction with the accompanying drawings, wherein:

FIG. 1A is a partial perspective cutaway view of a tire assembly of the first embodiment, as it would be when partially-deflated and resting on a road surface;

FIG. 1B is a cross-sectional side view of the partially-deflated tire assembly of FIG. 1A, wherein the tire assembly is rotating and the bladder is approaching the ground;

FIG. 1C is a cross-sectional side view of the partially-deflated tire assembly of FIG. 1B, wherein the tire assembly has rotated further, and the bladder is moving away from the ground;

FIG. 1D is a cross-sectional side view of a tire assembly of the second embodiment, as it would be when partially-deflated and resting on a road surface;

FIG. 2 is a diagrammatic cross-sectional side view of a tire assembly of the third embodiment, as it would be when partially-deflated and resting on a road surface; and FIGS. 3A–3C show a cross-sectional side view of a tire assembly of the fourth embodiment, as it would be when partially-deflated and resting on a road surface.

DETAILED DESCRIPTION OF THE INVENTION

FIG. 1A is a partial perspective cutaway view of a tire assembly 100 according to the first embodiment of the present invention, as it would be when it is partially-deflated and resting on a road surface (or "ground") 104. The tire assembly 100 has a tire 110, a rim 112 and a tire deflection alarm system ("alarm system") 114.

The tire 110 has a tread area 116 (meant herein to include the tread and materials directly beneath the tread such as belts, plies and innerliner), two sidewalls 118 and two bead regions 120. The portion of the tread area 116 that contacts the ground 104 is called a footprint area 122.

The rim 112 has a rim well 124 and two rim flanges 126 upon which the bead regions 120 are seated snuggly to form an airtight seal. A tire cavity 128 is bounded by the rim well 124 and inner surfaces of the tire 110.

Preferred Embodiment

The alarm system 114 has a belt 130 disposed tightly around the rim well 124, a first bladder (or just "bladder") 132a (having a first bladder opening 134a or just "bladder opening", i.e. inlet) attached to the belt 130, a "first whistle" 136a (or just "whistle") affixed to the first bladder opening 134a, and a counterweight 138 attached to the belt 130 on the opposite side of the rim 124 from the first bladder 132a and the first whistle 136a.

The bladder 132a is constructed so that, when squeezed (under external force), air from within the bladder is blown through its opening 134a and out through the whistle 136a, and when the force is removed, the bladder automatically expands to self-inflate with air passing back through the alarm 136a. The bladder 132a can equally be in the form of a bellows that is spring-loaded to bias it open.

The whistle 136a is any air activated noise maker or alarm, emitting a loud audible sound (i.e. "whistle") when air passes through it preferably whether in the inhale or exhale direction ("inhale" meaning toward the bladder 132a and "exhale" meaning away from the bladder). However, it is within the scope of the present invention for the whistle 136a to whistle upon only inhale or only exhale of air. The bladder 132a and the whistle 136a are preferably made of plastic to be low cost, light weight and corrosion resistant.

The counterweight 138 is any mass of material that balances out the weight of the bladder 132a and the whistle 136a, to keep the alarm system 114, and hence the tire assembly 100, balanced. The counterweight 138 can be any suitable shape or size and of any suitable material.

The belt can be constructed of any suitable design and material. As an example, U.S. Pat. No. 4,235,184 discloses a device for mounting a sensor on a tire rim, having metal strapping, a strapping seal and counterweight components.

FIG. 1B is a cross-sectional side view, cut along the equatorial plane (plane perpendicular to the tire axis and passing through center of the tread), of the partially-deflated tire assembly 100 of FIG. 1A, wherein the tire assembly is rotating and the bladder 132a is approaching the ground 104. FIG. 1C is a cross-sectional side view, cut along the equatorial plane, of the partially-deflated tire assembly 100 of FIG. 1B, wherein the tire assembly has rotated further and the bladder 132a is moving away from the ground 104. The reference numerals in FIGS. 1B and 1C match those of FIG. 1A.

In general, the lower the tire inflation pressure, the closer the footprint area 122 comes to the rim well 124. This is especially true for non-runflat tires. In operation, when the tire 110 is totally or partially deflated, when the bladder 132a is not adjacent to the footprint area 122, it is self-inflated. As shown in FIG. 1B, as the tire assembly 100 rotates (as illustrated by arrow 140), bringing the bladder 132a adjacent to the footprint area 122, the bladder 132a is squeezed between the rim well 124 and the footprint area 122, causing the bladder to exhale air out its opening 134a and through the whistle 136a (as illustrated by arrows 142), causing it to whistle. As shown in FIG. 1C, as the wheel rotates further (as illustrated by arrow 144), bringing the bladder 132a away from the footprint area 122, the bladder expands (self-inflates), inhaling air through the whistle 136a (as illustrated by arrows 146), causing it to whistle again. Hence, the whistle 132a whistles twice per tire revolution, powered from repetitive pneumatic pulsations (inhale and exhale) from the bladder 132a as the tire assembly 100 rotates. In practice, the exhaled whistle and the inhaled whistle, being in rapid succession, may be perceived as one whistle per revolution. If the whistle 136a is the type that only whistles upon exhale or only upon inhale, then it will whistle only once per tire revolution. The audible whistles alert the driver to the deflated condition.

When the tire 110 is properly inflated, the footprint area 122 is farther from the rim 112 than when deflated. The alarm assembly 114 is designed such that, when the tire 110 is inflated above some threshold inflation, the bladder 132a is not squeezed between the footprint area 122 and the rim 112, or at least not squeezed enough to produce an audible whistle. The bladder size is selected such that, below the threshold inflation (typically 1 bar), the alarm system 114' will whistle with each revolution, and above the threshold inflation, it will not whistle.

Second Embodiment

FIG. 1D is a cross-sectional side view of a tire assembly 100' of a second embodiment of the present invention, as it would be when partially-deflated and resting on a road surface 104. The tire assembly 100' is identical to the tire assembly 100 of the first embodiment of FIGS. 1A–1C, except that the tire assembly 100' has an alarm system 114' that has, in place of the counterweight (140 in FIGS. 1A–1C), a second bladder 132b (having a second opening 134b) and a second whistle 136b. The reference numbers in FIG. 1D correspond to those in FIG. 1A–1C. The alarm system 114' of the second embodiment works in the same way as the alarm system 114 of the first embodiment, except that, by having two whistles 136a, 136b, it whistles twice as many times per tire revolution. Whereas, in the first embodiment, the first bladder 132a and first whistle 136a are counterbalanced by the weight 138, in the second embodiment, the first bladder 132a and first whistle 136a are counterbalanced by the second bladder 132b and the second whistle 136b.

Third Embodiment

FIG. 2 is a partially-diagrammatic and partially cross-sectional (cut along the equitorial plane) side view of a tire assembly 200 according to a third embodiment of the present invention. Whereas, in the first and second embodiments, the pneumatic pulsations (when the tire is deflated) sound an audible whistle, in the third embodiment, the whistle is ultrasonic (typically inaudible) and is sensed by an electronic circuit disposed outside the tire cavity, which then informs the driver of the deflated condition via an audible alarm or visual display inside the vehicle.

The tire assembly 200, mounted on a vehicle (not shown), has a tire 210 (identical to the tire 110 of FIGS. 1A–1D), a rim 212 (identical the rim 112 of FIGS. 1A–1D) and a tire deflection alarm system ("alarm system") 214. The tire 210 includes a tread area 216, two sidewalls (not shown) and two bead regions (not shown). The portion of the tread area 216 that contacts the ground 204 is called a footprint area 222. The rim 212 includes a rim well 224 and two rim flanges (not shown) upon which the bead regions are seated snuggly to form an airtight seal. A tire cavity 228 is bounded by the rim well 224 and inner surfaces of the tire 210.

The alarm system 214 has a belt 230 disposed tightly around the rim well 224, a bladder 232 (having a bladder opening 234) attached to the belt 230, a whistle 236 connected to the bladder opening 234, and a counterweight attached to the belt 230 on the opposite side of the rim well 224 as the bladder 232 and the whistle 236. The whistle 236 whistles at a distinct preselected ultrasonic frequency each time air is exhaled (or alternatively inhaled, or both) by the bladder 232. The alarm system 214 also has, disposed outside the tire cavity 228, an electronic circuit 250 that can sense the ultrasonic whistle of the whistle 236 via a microphone 252 (or any suitable means of sensing the ultrasonic whistle) disposed outside and near the tire 210 and has filtering capability to distinguish the distinct ultrasonic whistle from environmental noise, and an audible alarm 254 inside the vehicle to inform the driver of a deflated condition.

In operation, when the tire assembly 200 of FIG. 2 is deflated, as the tire assembly 200 rotates, the alarm system 214 emits one distinct ultrasonic whistle per tire revolution by the same mechanism as the alarm 114 emitted audible whistles in the first embodiment.

The ultrasonic whistles are picked up by the microphone 252 and processed by the circuitry 250, distinguishing the whistles from other, environmental, noise by their distinct frequency and their periodicity (time between whistles). The circuitry 250 alerts the driver of the deflated condition by means of the audible alarm 254 or visual display inside the vehicle.

The circuitry 250, can distinguish the whistles emitted by the whistle 236 from environmental noise of the same frequency through several means. For example, if the circuitry 250 senses whistles of the correct frequency (i.e. the distinct frequency of the whistle 236) whose period is shorter than 0.01 second, the circuit can conclude that those whistles are too frequent to be emanating from the tire assembly 200 (and must be environmental noise). Additionally, if the period of the sensed whistles change significantly from one whistle to the next, the circuit can conclude that it is changing too quickly to be emanating from the tire assembly 200 (and must be environmental noise). To even more precisely distinguish the whistles from environmental noise, the circuit 252 can be connected to (and communicate with) the vehicle's speedometer to check whether the periodicity of the sensed whistle is reasonable in light of the vehicle speed.

In this third embodiment (as with the first embodiment), the size of the bladder 232 is designed such that, when the tire is inflated beyond a preselected threshold (such as 1 bar), the footprint 222 is too far from the rim well 224 to squeeze the bladder 232 to produce a whistle.

Although the alarm systems of the present invention (as illustrated by the three embodiments above) are suited for non-runflat tires, they are most advantageous for runflat tires, whose deflated condition is not as easily sensed by the driver.

The tire deflation alarm systems of the present invention, as illustrated by the three embodiments above, have the following advantages relative to the prior art: They are relatively light, low cost, corrosion resistant, balanced around the rim, can work with any standard rim and tire, do not require a specially-modified rim or tire, do not require conveying electric power into the tire cavity, and work even at low speeds (because their mechanism is not based on centrifugal force).

Other Applications For "Pneumatic Pulsations"

FIG. 3 is an embodiment of the present invention, as it would be when partially-deflated and resting on a road surface (ground) 304. The fourth embodiment is identical to the first embodiment (FIGS. 1A–1C), except that the whistle (132a in FIGS. 1A–1C) is replaced by a percussion noise maker like a gong mechanism. The tire assembly 300 has a tire 310 and a rim 312 (having a rim well 324) identical to the tire 110,210 and the rim 112,212 of the three previous embodiments. The tire assembly 300 also has an alarm system 314 within a tire cavity 328 bounded by the rim well 324 and the inside surfaces of the tire 310. The alarm system 314 has a belt 330 disposed tightly around the rim well 324, a bladder 332 (identical in placement and function as the bladders 132a, 132b, 232 of the previous three embodiments), and a gong mechanism 360. The gong mechanism 360 is connected to an opening 334 of the bladder 332 by a tube 362. The gong mechanism 360 has a bellows 364 (affixed to either the bladder 332, the belt 330 or the rim well 324 by means any suitable means, not shown), a hammer 366 (or "clapper") and a metal block 368 affixed to the rim 312. Air (pneumatic pulsations) exiting the bladder 332 when the tire is deflated (in the process described in the first embodiment), passes through the tube 362 and inflates the bellows 364 to push the hammer 366 to strike the block 368 which vibrates the rim 312 to produce repeated clang sounds (one clang per tire revolution) to alert the driver of a flat tire.

Whereas the four embodiments described above use the pneumatic pulsations to produce a whistle or clang, the pneumatic pulsations can be used to activate other mechanisms, either electronic or mechanical. For example, as a modification of the first embodiment (FIGS. 1A–1C), an electric buzzer inside the tire cavity 128 can be activated by an air flow switch that conducts electricity in response to air flow.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims. These devices are responsive to low pressure but not tread deflection.

What is claimed:

1. A tire deflection alarm in a tire assembly, comprising:
    an alarm system disposed within a rim well of a tire assembly, the alarm system having a belt disposed tightly around the rim well, a first bladder attached to the belt, and a counterweight attached to the belt, the bladder and the counterweight being disposed diametrically opposite one another within the tire assembly.

2. A tire deflection alarm in a tire assembly according to claim 1, wherein:
    the first bladder has a first noise maker responsive to compression and expansion of the first bladder.

3. A tire deflection alarm in a tire assembly according to claim 2, wherein:
    the first noise maker is a first whistle.

4. A tire deflection alarm in a tire assembly according to claim 3, wherein:
    the first whistle emits an audible sound.

5. A tire deflection alarm in a tire assembly according to claim 3, wherein:
    the first whistle emits an ultrasonic sound.

6. A tire deflection alarm in a tire assembly according to claim 2, wherein:
    the first noise maker is a percussion noise making mechanism.

7. A tire deflection alarm in a tire assembly, comprising:
    an alarm system disposed within a rim well of a tire assembly, the alarm system having a belt disposed tightly around the rim well, a first bladder attached to the belt, and a second bladder attached to the belt, the first and second bladders being disposed diametrically opposite one another within the tire assembly.

8. A tire deflection alarm in a tire assembly, according to claim 7, wherein:
    the first and second bladders have corresponding first and second noise makers responsive to compression and expansion of the first and second bladders, respectively.

9. A tire deflection alarm in a tire assembly according to claim 8, wherein:
    at least one noise maker is a whistle.

10. A tire deflection alarm in a tire assembly according to claim 9, wherein:
    the whistle emits an audible noise.

11. A tire deflection alarm in a tire assembly according to claim 9, wherein:
    the whistle emits an ultrasonic noise.

12. A tire deflection alarm in a tire assembly according to claim 2, wherein:
    at least one noise maker is a percussion noise making mechanism.

13. A tire deflection alarm in a tire assembly according to claim 1, wherein:
    the alarm system has at least one noise maker responsive to deflection of a tire of the tire assembly to produce a noise; sensing means disposed outside of the tire assembly, said sensing means being responsive to the noise produced by the at least one noise maker to produce a signal; and an electronic circuit responsive to the signal from the sensing means.

14. A tire deflection alarm in a tire assembly according to claim 13, wherein:
    the sensing means is a microphone.

15. A tire deflection alarm in a tire assembly according to claim 13, wherein:
    the noise maker produces at least a characteristic frequency; and
    the electronic circuit is responsive to the characteristic frequency.

16. A tire deflection alarm in a tire assembly according to claim 13, wherein:

the at least one noise maker produces periodic noises corresponding to a frequency of rotation of the tire assembly; and the electronic circuit compares the periodic noises to the frequency of rotation of the tire assembly.

17. A tire deflection alarm in a tire assembly according to claim 13, wherein:

at least one noise maker is a percussion noise making mechanism.

18. A tire deflection alarm in a tire assembly according to claim 13, wherein:

at least one noise maker is a whistle.

19. A tire deflection alarm in a tire assembly according to claim 18, wherein:

the whistle produces an ultrasonic noise.

* * * * *